June 9, 1925.
O. G. EDMOND
ROTARY CUTTER
Filed June 9, 1924
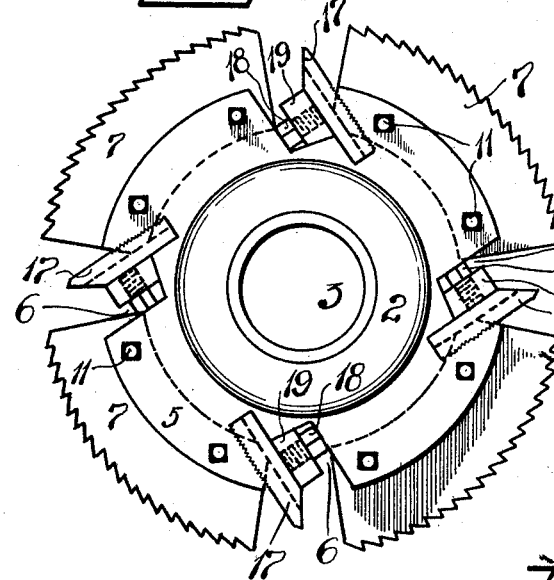
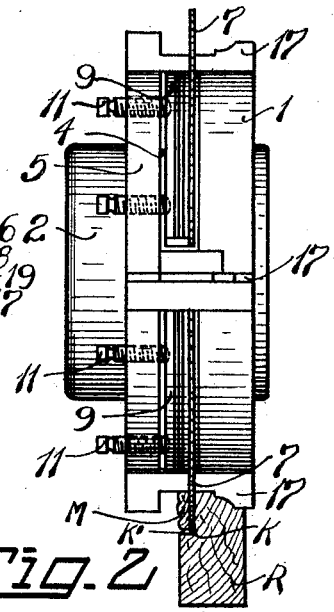
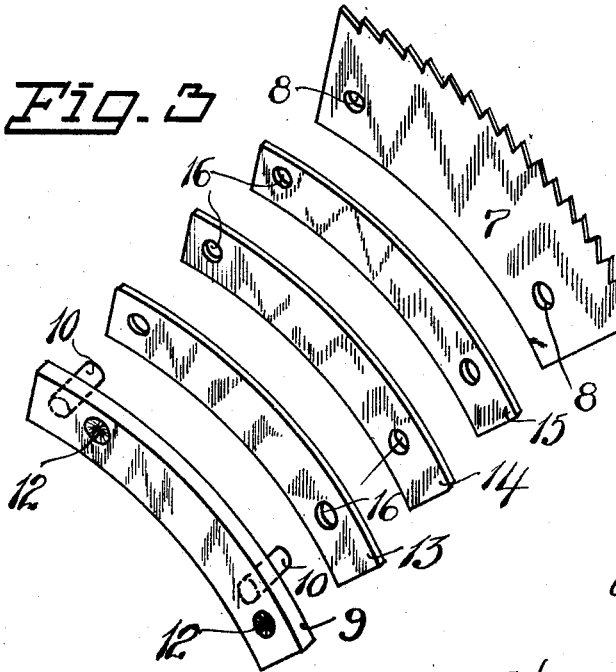
Inventor
Oscar G. Edmond
By Herbert E. Smith
Attorney Patented June 9, 1925.

1,541,034

UNITED STATES PATENT OFFICE.

OSCAR G. EDMOND, OF SPOKANE, WASHINGTON, ASSIGNOR OF ONE-HALF TO WHITE PINE SASH COMPANY, OF SPOKANE, WASHINGTON.

ROTARY CUTTER.

Application filed June 9, 1924. Serial No. 718,786.

*To all whom it may concern:*

Be it known that I, OSCAR G. EDMOND, a citizen of the United States, residing at Spokane, in Spokane County and State of Washington, have invented certain new and useful Improvements in Rotary Cutters, of which the following is a specification.

My present invention relates to improvements in rotary cutters or saws for use in woodworking, and while the device of my invention is well adapted for various purposes in milling operations, it is especially designed for sawing and planing frame rails for use in the manufacture of door screens, window screens and similar articles of manufacture, where a binding strip or mold strip is to be attached. By the utilization of my invention the frame rail is milled at one edge and the binding strip or mold strip is sawed from the opposite edge of the rail during one operation of the rotary cutter. Previous to the milling operation however a lateral kerf is sawed in the rail, and during the milling operation the rail is trimmed and the prepared binding strip or mold strip is severed from the rail by sawing, for future use with the rail.

Means are provided in the rotary cutter head for varying the distance between the milling knives or planing bits and the saw sections for adjusting and adapting the cutter head to different thicknesses of rails, and the invention consists in certain novel combinations and arrangements parts involving the disk of the cutter head and the saw sections and planing bits carried thereby as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view of a rotary cutter constructed according to and embodying the novel features of my invention.

Figure 2 is an edge view of the rotary cutter or saw showing it in operative position with relation to a frame rail and illustrating the separation therefrom of the binding strip or mold strip, for a screen or similar article.

Figure 3 is a view in perspective illustrating the relation of a saw section, its spacing shims and its retaining plate, detached from the head.

Figure 4 is a transverse sectional view through a saw section, its shims and retaining plate.

The rotary head 1 is in the form of a circular disk and provided with a hub 2 and bearing 3 for attachment to a saw arbor or shaft for rotation therewith. In the exterior periphery of the disk is fashioned an annular groove 4 which forms at the front of the disk an annular flange 5, and the disk, at equidistant points is provided with transverse notches or recesses 6 which extend through the flange and interrupt the groove 4.

A plurality of saw sections 7, of arcuate form are carried by the rotary head and each saw section or blade is fashioned with a pair of spaced apertures or holes 8 extending transversely therethrough. The saw sections are alined circumferentially to cut a kerf K in the rail R of Figure 2, and the sections are carried by the disk in conjunction with the complementary saw plates 9 also of arcuate formation and located within the groove 4 with the saw sections. Each saw plate is provided with a fixed dowel pin 10 or a pair of pins for engagement in the holes 8 of the saw section, and set bolts or screws 11 are threaded transversely through the flange 5 for engagement with the saw plates 9. For centering the saws or saw sections and efficiency in retaining them in place the saw plates may be provided with recesses or indentations 12 in one side for contact or engagement with the inner ends of the set bolts 11. For varying the distance between the saw plates and the saw sections one or more shims may be interposed therebetween, three of which shims are indicated as 13, 14, and 15, and all of which are fashioned with registering apertures or holes 16 arranged in spaced relation, two to each shim. In assembling the saw sections on the disk of the cutter head the required number of shims are slipped over the dowel pins 10 and then the saw section is slipped over the ends of the pins, as indicated in Figure 4. These assembled parts are then placed in the groove 4 and located in position so that when the set bolts 11 are tightened the bolts will engage in the indentations 12 of the saw plate. By turning the bolts the saw section and its accessories are clamped in the grooved head. To adapt the saw sections to various widths of rails the shims may be located between the saw sections and the wall of the groove of the disk, and the number of shims used between the saw plate and saw section may also be varied for this purpose.

In connection with the saw sections a similar number of planing bits or milling blades or knives 17 are carried by the disk of the cutter head. These knives are located in the notches 6 of the disk and extend transversely of the head and are designed to trim the edge of the rail R as indicated in Figure 2. The knives are arranged tangentially with relation to the cutter head and are secured therein by set bolts 18 in the lugs 19 of the disk, the saw sections and knives alternating around the periphery of the cutter head.

In the manufacture of screen rails, the rail is first sawed along one side to form a kerf K' extending longitudinally of the rail and the rail is then passed through the machine employing the cutter head of my invention where the kerf K is sawed to form the molding strip M and separate the strip from the rail. After separation the mold strip M will of course fit neatly in the groove formed in the rail and the molding strip may be used to retain a screen in the frame. The thickness of the mold strip may be varied in proportion to the thickness of the rail and the saw sections may be adjusted laterally in accordance with the thickness of the rail and mold strip.

Thus it will be apparent that the cutter head is adapted to fashion the rail and also to fashion the mold strip which is cut therefrom, and by this arrangement of parts the rail and its mold strip are manufactured with accuracy and facility, and economy in material is effected in that no waste is present in the formation of the mold strip.

The several saw sections, shims, and saw plates are of standard sizes and shapes and are interchangeable, and each saw section may be readily assembled and attached to or detached from the cutter head with convenience and without the necessity for skilled labor or special tools.

Having thus fully described my invention, what I claim as new and desire to secure by Letters Patent is—

1. The combination with a rotary head having an exterior annular groove and a retaining flange formed thereby, of a saw section and a saw plate in the groove, retaining means on the plate for engaging the section, and retaining means supported in the flange for engaging the plate.

2. The combination with a rotary head having an annular groove and a retaining flange formed thereby, of a perforated saw section and a saw plate in the groove, a dowel pin fixed to the plate for engagement with the perforated section, and retaining means supported in the flange for said plate.

3. The combination with a rotary head having an exterior annular groove and a retaining flange formed thereby, of a perforated saw section and saw plate in the groove, a dowel pin on the plate for engagement with the perforated section, and a set bolt in the flange for engagement with said plate.

4. The combination with a rotary head having an exterior annular groove and a retaining flange formed thereby, of a perforated saw section and perforated shims associated therewith and a saw plate in said groove, a dowel pin on the saw plate engaging said shims and section, and a set bolt in the flange for engagement with said plate.

5. The combination with a rotary cutter head having an annular groove and a retaining flange formed thereby, of a series of spaced arcuate saw sections in said groove and a series of alternately spaced, transversely arranged milling blades, and means for adjusting said saw sections laterally with relation to the milling blades.

6. The combination with a rotary cutter head having an annular exterior groove and spaced transverse notches, of a series of laterally adjustable, spaced, arcuate saw sections disposed in said groove and a series of alternately spaced, transversely disposed milling blades carried in said notches, means for securing the respective saw sections in said groove, and means for securing said milling blades in said notches.

In testimony whereof I affix my signature.

OSCAR G. EDMOND.